United States Patent Office 3,456,882
Patented July 22, 1969

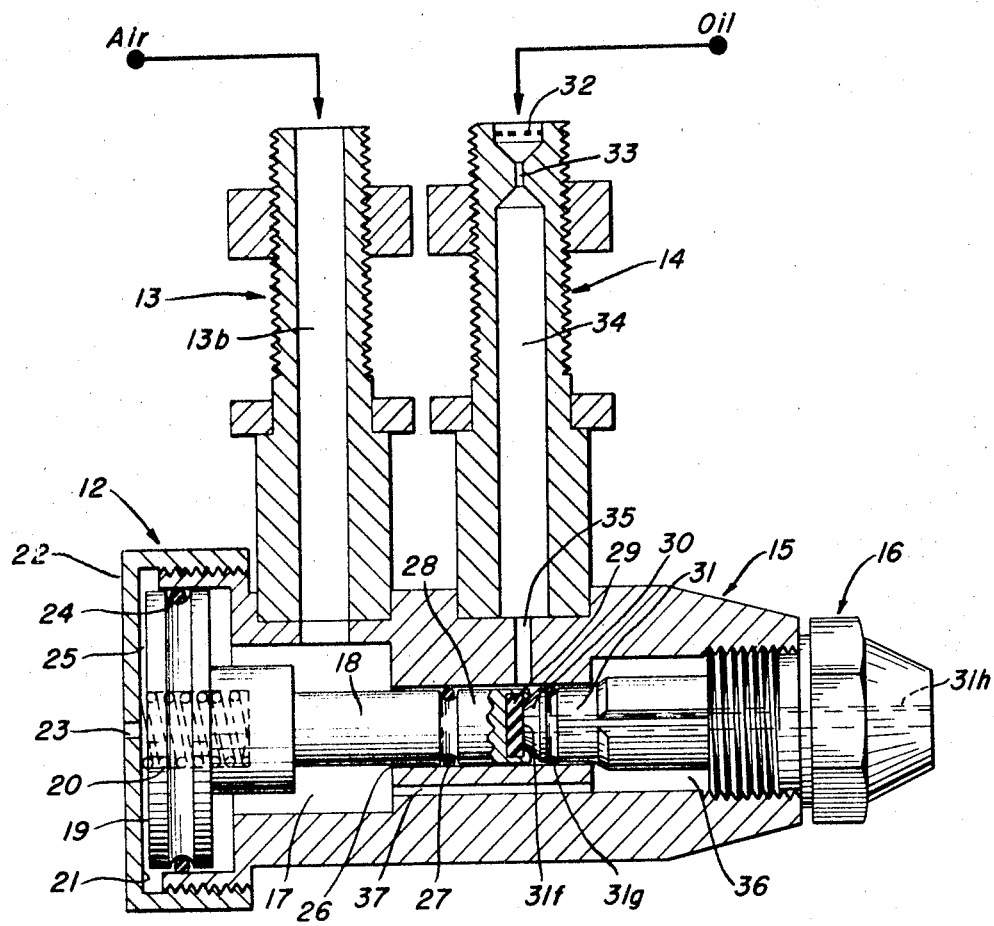

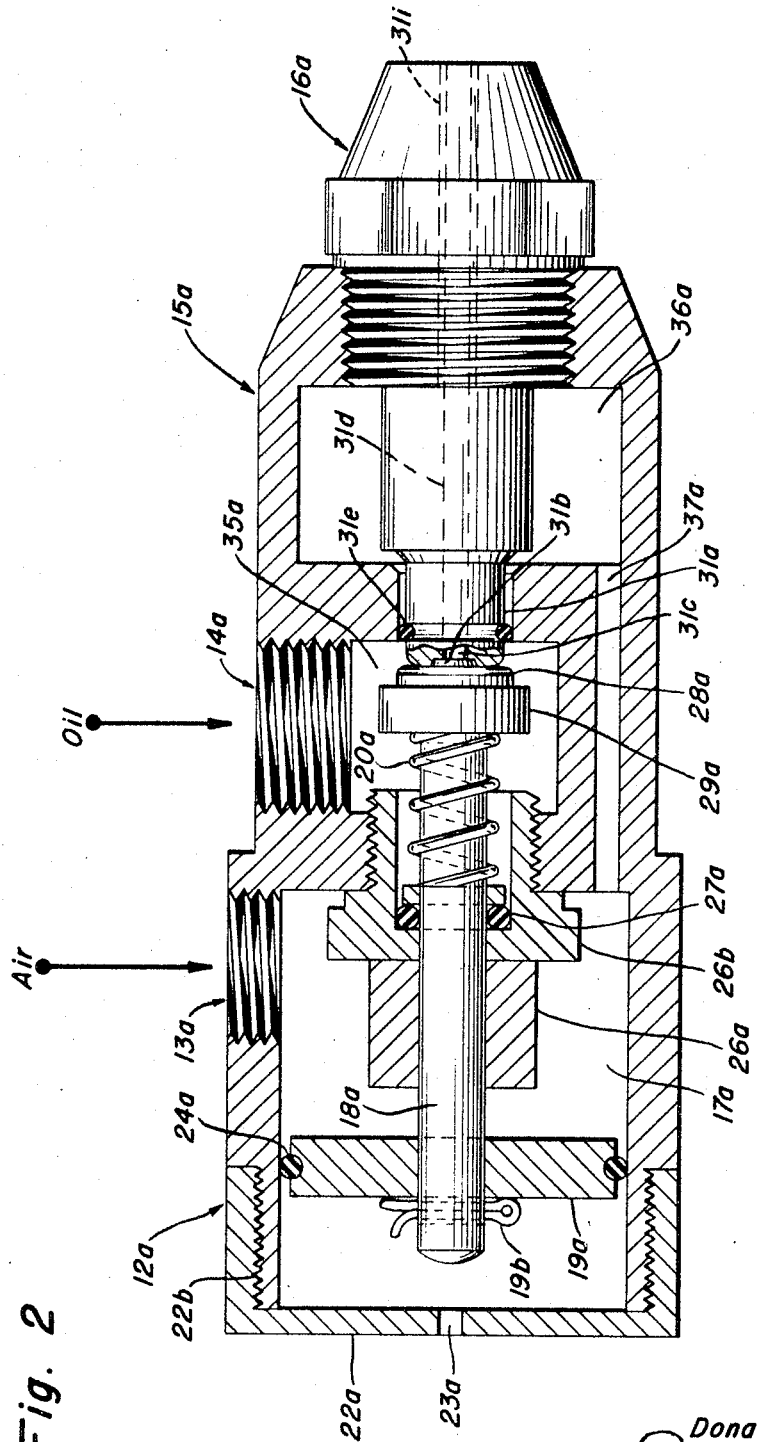

3,456,882
FLAME CULTIVATION APPARATUS AND METHOD
Donald C. Walker, Munster, Ind., assignor to Standard Oil Company, Chicago, Ill., a corporation of Indiana
Filed May 29, 1967, Ser. No. 642,064
Int. Cl. B05b 7/08; F23d 11/10
U.S. Cl. 239—412                         1 Claim

ABSTRACT OF THE DISCLOSURE

Aspirating means and method for producing a controlled flame for flame cultivation including in combination a housing having an air inlet and an oil inlet. The air inlet communicates with a first air chamber within the valve housing. The chamber has a spring urged piston and shaft against which the air under pressure in the chamber exerts a force to move the piston which is connected by the shaft to the oil inlet which allows oil to pass under pressure through the inlet means for aspiration from the nozzle. The first air chamber communicates with a second air chamber through a plurality of small openings to allow air to be discharged through an annulus of the nozzle to aspirate the oil.

BACKGROUND OF THE INVENTION

Only recently has flame cultivation become a practical means for controlling weed growth around crop plants. Conventional techniques for controlling weed growth include mechanical cultivation, and the application of chemicals which result in the development of an undesirable hard pan, chemical residue deposits in the soil and the attendant soil sterilization as well as the possibility of harmful chemicals occurring in the foods processed from the harvested crops.

The relatively recent development of flame cultivation has required the use of the more expensive LPG fuels. This invention is directed toward an aspirating means for producing a controlled flame in a flame cultivator fired by oil which results in a reduction in fuel cost alone of about 50% or more. Oil fired flame cultivation burners employing LPG as a fuel are not only exceedingly expensive to operate but they have not been desirably simplified in their structure as have the cultivators fired by fuel oil. Furthermore, the LPG fired flame cultivator produces an invisible flame which is not desirable from the standpoint of succesful operation in the field. Consequently, a means for coloring the invisible LPG flame is required in order to visually determine whether favorable operating characteristics are present during use.

Accordingly, this invention provides means for aspirating a fuel oil to produce a controlled visible flame in a simple inexpensive manner that is readily adaptable to the rigorous equipment requirements necessary in the successful operation of an agricultural implement. The aspirating means is not only simple and inexpensive but it is also durable, heat resistant, and relatively foolproof in operation. Furthermore, this means for aspirating a fuel oil to produce a controlled flame for flame cultivation provides a positive fuel shutoff to eliminate drip and the usual problems caused by the accumulation of minute particles of soil and the attendant after-burning of the drip as well as the elimination of the dangers associated with and inherent in the use of a flammable material. Additionally, this invention obviates the dangers involved in the use of LPG by substituting a more desirable fuel such as oil.

SUMMARY OF THE INVENTION

This invention relates to a means for aspirating a fuel oil to produce a controlled flame for use in the flame cultivation of plants. This means for aspirating an oil includes in combination an aspirating means having a housing with an air inlet means and an oil inlet means. The air inlet means communicates with a first air chamber interior of the housing which contains a spring urged piston connected to a shaft extending through the chamber. The shaft has a forward end which mates with a rearward inlet end of a nozzle means which communicates with the oil inlet means within the valve housing. The inlet end of the nozzle means communicates with the forward oil outlet end of the nozzle. The first air chamber communicates with a second air chamber through a plurality of small passageways located substantially parallel to and coincidental with the shaft. The second air chamber communicates with the outlet end of the nozzle through an annulus about the oil outlet at the nozzle outlet end. The method of the invention includes passing air under pressure through an inlet to an air chamber in a housing of an aspirating means, moving a piston and shaft by the force of the air, opening the oil inlet and moving the oil through the nozzle, exhausting the air from the housing about the oil to aspirate the effluent fuel.

BRIEF DESCRIPTION OF THE DRAWING

A more complete understanding of the structural elements of this novel aspirating apparatus will be augmented by reference to the attached drawing wherein:

FIG. 1 is an elevation view in partial section showing the apparatus intact with the air and oil inlet means, a first chamber having a piston and shaft therein, and a second air chamber and a nozzle means for aspirating fuel; and FIG. 2 is an elevation view in partial section of an embodiment of the aspirating means.

DESCRIPTION OF THE PREFERRED EMBODIMENTS

With reference to FIG. 1, numeral 12 designates the aspirating means having air inlet means 13, oil inlet means 14, housing 15, and nozzle means 16. Air inlet means 13 rigidly attached to housing 15 communicates with a first air chamber 17 located internally of the housing 15. Extending through the first air chamber 17 is shaft 18 having one end rigidly mounted on a spring urged piston 19 in contact with spring removable means 20 extending between the inner wall 21 of rear housing cap 22 and piston 19. The rear housing cap has exhaust port 23 and the cap forms a part of housing 15. Piston 19 has O-ring 24 extending about the grooved periphery of the movable piston within the cylinder 25 at the rear of housing 15. Cylinder 25 is substantially larger than chamber 17 and accommodates the movement of piston 19.

Shaft 18 extends forwardly through the first air chamber 17 and into a shaft guide 26 where the shaft is equipped with an O-ring 27 and the shaft terminates forwardly thereof in an end having a dished surface 29 adapted to mate with the expanded surface 30 of the trailing end 31 of nozzle means 16. Oil inlet means 14 has screen 32 at its upper end with orifice 33 located a short distance from the screen. Chamber 34 extends from orifice 33 into housing 15 where the chamber 34 terminates in a small oil passageway 35 which communicates with the mating dished surface 29 of forward shaft end 28 and expanded surface 30 of the trailing end 31 of nozzle means 16.

The first air chamber 17 communicates with the second air chamber 36 through a plurality of small air passageways 37 extending essentially parallel to shaft 18 and substantially coincidental with shaft guide 26. The first air chamber 17 also communicates with the air in the air inlet means 13 which extends into and is rigidly mounted on housing 15. Air inlet means 13 has air chamber 13b which extends into housing 15 and chamber 17 to deliver sufficient quantities of air under pressure to chamber 17.

With reference to FIG. 2, the aspirating means 12a includes air inlet means 13a, oil inlet means 14a, housing 15a, and nozzle means 16a. Air inlet means 13a communicates with a first air chamber 17a which accommodates shaft 18a and piston 19a. Shaft 18a is attached centrally of piston 19a and the shaft 18a extends through shaft guide means 26a and flange 26b and terminates in closure means 29a on the forward shaft end 28a which mates with the dished surface 31b in the trailing end 31a of nozzle means 16a. The O-ring 27a is seated in the forward side of flange 26b behind spring 20a which rests against the rearward side of the closure means 29a located at the forward shaft end 28a of shaft 18a. Oil chamber 35a connecting directly with oil inlet means 14 accommodates the forward end of shaft 18, closure means 29a, spring 20a and the forward end of flange 26b. The trailing end 31a of nozzle means 16a has nozzle oil inlet 31c which forms the commencement of the nozzle oil passageway 31d of nozzle means 16a.

Rear housing cap 22a forms the housing at the rear of the aspirating means and has exhaust port 23a. Piston 19a has O-ring 24a set in a groove extending about the periphery of the piston to provide a positive seal between the forward part of the first air chamber 17a and the rear part of the chamber separated by piston 19a. Piston 19a may be attached to shaft 18a by means of the cotter pin 19b or any other suitable fastening means. Exhaust port 23a can be eliminated if the threads 22b or any other suitable fastening means have a sufficiently loose fit to permit the venting of air from the rear part of the first air chamber behind piston 19a.

In operation, fuel oil under a pressure of an amount slightly above zero to about 15 p.s.i.g. is charged about the oil inlet means 14 through screen 32 and orifice 33 to fuel chamber 34 and oil passageway 35. The aspirating means is rigidly attached within a combustion zone to a flame cultivator which passes between the rows of plants in fields to remove the weeds and foreign heat sensitive matter by burning with a controlled flame produced by the proper aspiration of the fuel oil. An ignition means not shown is employd to commence the burning of the aspirated fuel to produce the controlled flame. In view of the demands on an apparatus used in this type of service the device must be such that it will withstand vibrations, elevated temperatures, minute particles of soil, dust, grease, etc. and yet be relatively simple to install, repair, adjust and replace by the untrained operator. Furthermore, the device metering and aspirating a flammable material must have a positive shut-off to eliminate drip and after-burning as well as complying with the standards of safety inherently required in the use of a flammable material.

Referring to FIG. 1, after fuel oil has been charged to the oil inlet means 14 under pressure ranging from slightly above zero to about 15 p.s.i.g., the air is charged to the air inlet means at a pressure within the range of about 15–60 p.s.i.g., preferably within a range of about 20–50 p.s.i.g., and optimally at a pressure of about 30 p.s.i.g. The air moved from chamber 13b to the first interior chamber 17 exerts a force upon the forward face of piston 19 disposed within cylinder 25 which has a substantially larger diameter than the first air chamber 17. The forces exerted on the forward face of piston 19 cause the piston to move rearwardly to part the mating surfaces 29 and 30 of shaft end 28 and controlling end 31 of nozzle means 16. As the mating surfaces are parted immediately below oil passageway 35 the oil flows into the nozzle oil inlet 31f located in the controlling end 31 of nozzle means 16. The O-ring 27 of moving shaft 18 and and the O-ring 31g of nozzle means 16 provide positive seals to prevent the oil from moving into either the first or second air chambers.

While the air under pressure is charged to air inlet means 13 including air chamber 13b and interior air chamber 17 to build up pressure within chamber 17 to exert force against the face of piston 19, the air is also bleeding through a plurality of small passageways 37 which are located about shaft guide 26 so that a portion of the air in chamber 17 is bleeding into a second interior air chamber 36 and it is discharged in an annulus 31h located around the oil discharge at the forward end of nozzle means 16. This novel apparatus provides the simultaneous movement of air through the interior passageways of the housing of the aspirator means while the air is also exerting forces against the forward face of piston 19 to move the piston and the rigidly mounted shaft 18 rearwardly to allow oil to move from oil passageway 35 into oil inlet 31f of nozzle means 16 for discharge at the forward end of the nozzle along with the air which is discharged through the annulus 31h to provide the proper aspiration of the oil to develop a controlled flame for flame cultivation.

With reference to FIG. 2, in operation oil under pressure is charged to the oil inlet means 14a and into a first interior oil chamber 35a interiorly located in housing 15a of aspirator means 12a. The oil has a pressure within the range of from about a small amount above zero to about 15 p.s.i.g. and a quiescent reservoir of oil is maintained within oil chamber 35a until air under pressure is charged to air inlet means 13a and first interior air chamber 17a. First air chamber 17a provides an environment wherein the air under pressure exerts a force against the forward piston face of piston 19 to move the piston rearwardly while some of the air is bleeding through a plurality of air passageways 37 into a second interior air chamber 36a.

As piston 19a moves rearwardly the attached shaft 18a moves rearwardly against spring means 20a to open the closure means 29a which allows oil in chamber 35a to move through nozzle oil inlet 31c and passageway 31d to be exhausted through the forward end of nozzle means 16a with air from chamber 36a which is exhausted through the annulus 31i at the leading end of nozzle means 16a to form a controlled mixture of exhausting air and oil into a combustion zone not shown to provide a controlled flame for flame cultivation. When the air flow through the air inlet means is terminated the forces exerted against the leading face of piston 19a cease to exist allowing spring means 20a to exert sufficient force against the rear face of closure means 29a to allow shaft 18a to move forward so that closure means 29a on forward shaft end 28a mates with the dished surface 31b and the controlling end 31a of nozzle means 16a to positively seal nozzle oil passageway 31d causing the cessation of the flow of oil through the forward end of the nozzle means. Advantageously, the termination of the charge of air to the air inlet means 13a provides a rapid and positive shutoff of fuel which prevents drip and the attendant after-burning. All of the positive elements of sealing and shutoff are also provided by the structure of the embodiment illustrated in FIG. 1.

The novel aspirating means of this invention provide a simple inexpensive device for supplying a metered amount of an oil ultimately to a combustion zone in an aspirated condition to produce a controlled flame. This novel aspirating means supplies a volumetric rate of about three cubic feet per minute of air at a pressure of about 30 p.s.i.g. to the combustion zone not shown and about ½–5 gallons per hour of oil having a pressure of from about slightly above zero to about 15 p.s.i.g., and preferably about 2 gallons per hour of oil to produce a flame having a length of about 24 inches with a maximum temperature of about 2100° F. within the incremental distance of about 8–17 inches, preferably about 12 inches from the forward end of nozzle means 16 and 16a in FIGS. 1 and 2 respectively.

Advantageously, each of the embodiments illustrated in FIG. 1 and FIG. 2 can be readily assembled and disassembled by easy removal of the forward end of the nozzle means 16 and 16a such as by threading or other suitable fastening means. Similarly, the rearward end of the aspirating means having rear housing cap 22 may be readily assembled such as by threading shown in the drawing or other suitable fastening means and the entire interior working parts can be removed and replaced in a very simple operation. In FIG. 2 the removal of the unitary piston guide means 26a and flange 26b by threads or other suitable fastening means allows the complete removal of the piston 19a, shaft 18a, O-ring 27a, spring means 20a, and closure means 29a of forward shaft end 28a for easy maintenance and/or complete exchange of interior assembly.

Having described the invention, what is claimed is:

1. An aspirator adapted to provide a controlled flame for removing weeds and the like, comprising:

an elongated housing having first and second interior chambers in communication with each other through an air passageway, and a guide way extending between said chambers along the longitudinal axis of the housing;

a movable shaft disposed along the longitudinal axis of said housing having a dished end lodged within the guide way and another end extending into the first chamber;

a piston secured to the end of the shaft extending into the chamber;

a nozzle disposed within the second chamber and along the longitudinal axis of said housing so that one end of the nozzle protrudes from the housing and another end of the nozzle is lodged within the guide way, said protruding end having an annulus adapted to aspirate oil and said other end being expanded so that it is adapted to mate with the dished end of the shaft;

an oil passageway within the nozzle extending between the ends of the nozzle;

a spring within the housing which urges the dished end of the shaft and expanded end of the nozzle into mating relationship;

an air inlet tube disposed along a line generally perpendicular to the longitudinal axis of the housing and coupled to the first chamber, said air inlet tube filling the first chamber with air which acts on the piston to disengage the mating ends of the shaft and nozzle to provide a gap between said mating ends, and simultaneously introducing air into said second chamber via the air passageway, said air in the second chamber feeding into said annulus; and an oil inlet tube disposed along a line generally perpendicular to the longitudinal axis of the housing and in communication with the mating ends of the shaft and nozzle so that as air is introduced into said first chamber oil is introduced into the gap between the mating ends of the shaft and nozzle, said oil passing through the oil passageway and out the protruding end of the nozzle.

References Cited

UNITED STATES PATENTS

| | | | |
|---|---|---|---|
| 1,169,091 | 1/1916 | Melas | 239—412 |
| 1,716,325 | 6/1929 | Rogers | 239—412 |
| 2,649,148 | 8/1953 | Topp et al. | 239—412 |
| 2,654,911 | 10/1953 | Sharlip et al. | 239—412 |
| 3,291,396 | 12/1966 | Walter | 239—412 |
| 3,376,097 | 4/1968 | Biber et al. | 239—8 |

EVERETT W. KIRBY, Primary Examiner

U.S. Cl. X.R.

239—8, 416, 417.5